(12) United States Patent
Yang et al.

(10) Patent No.: US 8,079,464 B2
(45) Date of Patent: Dec. 20, 2011

(54) HYDROGEN STORAGE MATERIALS

(75) Inventors: Jun Yang, Ann Arbor, MI (US); Andrea Pulskamp, Plymouth, MI (US); Shinichi Hirano, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/981,605

(22) Filed: Dec. 30, 2010

(65) Prior Publication Data

US 2011/0142752 A1  Jun. 16, 2011

(51) Int. Cl.
*C01B 3/08* (2006.01)
*B01J 20/02* (2006.01)

(52) U.S. Cl. .......... 206/0.7; 420/900; 423/657; 502/400

(58) Field of Classification Search .................. 206/0.7; 420/900; 423/657; 502/400
See application file for complete search history.

(56) References Cited

U.S. PATENT DOCUMENTS

| | | | |
|---|---|---|---|
| 4,036,944 A | 7/1977 | Blytas | |
| 4,488,906 A | 12/1984 | Gondo et al. | |
| 5,906,792 A | 5/1999 | Schulz et al. | |
| 5,964,965 A | 10/1999 | Schulz et al. | |
| 6,329,101 B1 * | 12/2001 | Kawakami | 429/218.2 |
| 6,471,936 B1 | 10/2002 | Chen et al. | |
| 7,648,567 B2 * | 1/2010 | Chabak | 96/108 |
| 7,708,815 B2 * | 5/2010 | Zimmermann | 96/108 |
| 2001/0033959 A1 | 10/2001 | Ovshinsky et al. | |
| 2002/0037454 A1 | 3/2002 | Tsuruta et al. | |
| 2003/0005982 A1 | 1/2003 | Ito et al. | |
| 2003/0031927 A1 | 2/2003 | Ito et al. | |
| 2004/0077493 A1 | 4/2004 | Antonelli | |
| 2005/0074612 A1 * | 4/2005 | Eklund et al. | 428/403 |
| 2006/0063003 A1 * | 3/2006 | Yang et al. | 428/403 |

FOREIGN PATENT DOCUMENTS

| | | |
|---|---|---|
| JP | 56114801 | 9/1981 |
| JP | 2006021161 | 1/2006 |
| PL | 162440 | 12/1993 |

OTHER PUBLICATIONS

R. Chahine et al., "Low Pressure Adsorption Storage of Hydrogen", Int. J. Hydrogen Energy, vol. 19, No. 2, pp. 161-164, 1994.
Yingwei Li et al., "Hydrogen Storage in Metal—Organic Frameworks by Bridged Hydrogen Spillover", JACS Communications, J. Am. Chem. Soc. 2006, 128, pp. 8136-8137.
T.C. Mike Chung et al., "Synthesis of Microporous Boron-Substituted Carbon (B/C) Materials Using Polymeric Precursors for Hydrogen Physisorption" J. Am. Chem. Soc. 2008, 130, pp. 6668-6669.
Hailian Li et al., "Design and Synthesis of an Exceptionally Stable and Highly Porous Metal-Organic Framework", Nature, vol. 402, Nov. 18, 1999, pp. 276-279.

* cited by examiner

*Primary Examiner* — Stuart Hendrickson
*Assistant Examiner* — Syed Iqbal
(74) *Attorney, Agent, or Firm* — Damian Porcari; Brooks Kushman P.C.

(57) ABSTRACT

In one embodiment, a hydrogen storage system includes a core of hydrogen sorbent material and a shell of crystalline metal hydride material enclosing at least a portion of the core of hydrogen sorbent material. In another embodiment, the hydrogen storage system further includes an intermediate layer of amorphous metal hydride material, at least a portion of which being positioned between the core of hydrogen sorbent material and the shell of crystalline metal hydride material.

11 Claims, 3 Drawing Sheets

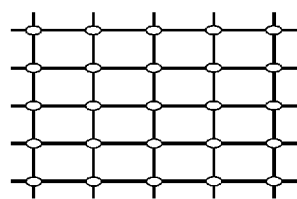
Fig. 3B1
2-D Crystalline
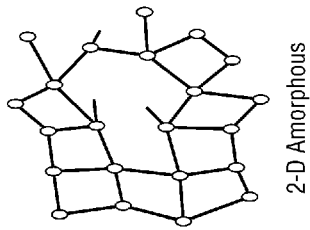
Fig. 3A1
2-D Amorphous
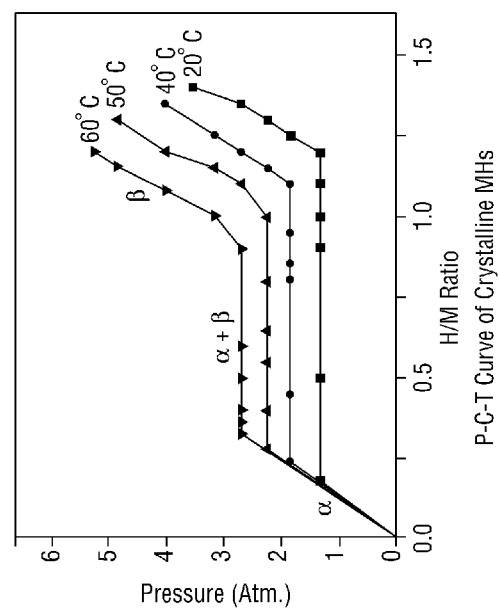
Fig. 3B2
P-C-T Curve of Amorphous MHs
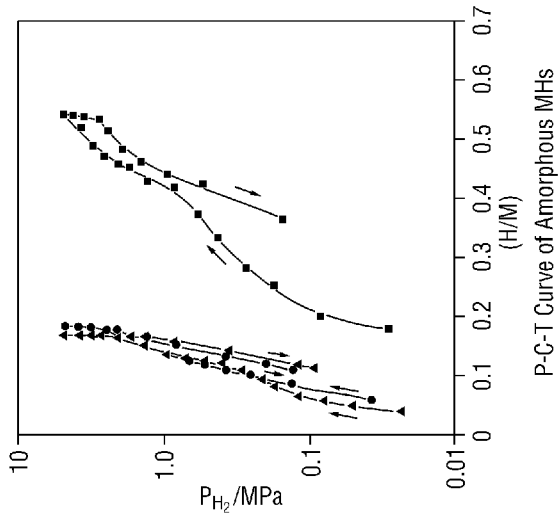
Fig. 3A2
P-C-T Curve of Crystalline MHs

HYDROGEN STORAGE MATERIALS

BACKGROUND

1. Technical Field

One or more embodiments of the present invention relate to hydrogen storage materials.

2. Background Art

Certain sorbent materials have been used for hydrogen storage. However, these sorbent materials have limited use because of necessary energy expenditures involved in maintaining relatively low temperatures for hydrogen storage. There is a continuing need for sorbent hydrogen storage materials with industrially acceptable cost efficiency for operation and maintenance.

SUMMARY

In one aspect, a hydrogen storage system is provided. In one embodiment, the hydrogen storage system includes a volume of hydrogen sorbent material, and a volume of metal hydride material adjacent the volume of hydrogen sorbent material. In certain instances, the volume of metal hydride material includes a volume of crystalline metal hydride material, a volume of amorphous metal hydride material, or combinations thereof.

In another embodiment, the volumes of hydrogen sorbent material and metal hydride material are present in a core/shell configuration such that the volume of metal hydride material forms a shell at least partially enclosing the volume of hydrogen sorbent material. In yet another embodiment, the hydrogen storage system is configured as a plurality core/shell particles.

The volume of hydrogen sorbent material may include high surface area porous materials such as active carbon, zeolites, metal organic frameworks (MOFs), aerogels, and combinations thereof. The volume of metal hydride material may include interstitial hydrides.

In yet another embodiment, the hydrogen storage system may be configured as a three-component system. In this design, the hydrogen storage system includes a volume of hydrogen sorbent material as the core, a volume of crystalline metal hydride material as the shell enclosing at least a portion of the core, and an intermediate layer of amorphous metal hydride material with at least a portion thereof being positioned between the core and the shell.

According to another aspect of the present invention, a method is provided for making a hydrogen storage system. In one embodiment, the method includes forming a plurality of hydrogen storage units each including a core of hydrogen sorbent material and a shell of metal hydride material enclosing at least a portion of the core of hydrogen sorbent material. In another embodiment, the method further includes introducing hydrogen into the plurality of hydrogen storage units to form the hydrogen storage system. In certain instances, the introducing step is carried out at a temperature of 100 Kelvin to 353 Kelvin.

BRIEF DESCRIPTION OF THE DRAWINGS

FIG. 3A1 depicts a non-limiting atomic arrangement of a crystalline metal hydride material according to yet another embodiment;

FIG. 3A2 depicts a non-limiting P-C-T curve of the crystalline metal hydride material of FIG. 3A1;

FIG. 3B1 depicts a non-limiting atomic arrangement of an amorphous metal hydride material according to yet another embodiment;

FIG. 3B2 depicts a non-limiting P-C-T curve of the amorphous metal hydride material of FIG. 3B1.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The present invention, in one or more embodiments, is a hydrogen storage system that does not use expensive precious catalyst metals such as platinum, and that may be operable at relatively low energy requirements. In certain instances, and as is detailed herein, the hydrogen storage material is formed of a core of hydrogen sorbent materials enclosed within a shell of metal hydride materials, wherein the shell of metal hydride materials is believed to provide in situ hydrogen storage and hydrogen dissociation catalytic activities. Certain conventional constructions use carbon substrates supporting precious platinum metals. These constructions, commonly referred to as "spill over" constructions, tend to form physical and/or energy barriers for dissociated hydrogen atoms to access otherwise available storage sites in the sorbent. In contrast, with respect to one or more embodiments of the present invention, the metal hydride catalyses dissociation of hydrogen to hydrogen atoms and provides interstitial spaces as channels for transporting dissociated hydrogen atoms to storage sites on or within the sorbent materials.

Figure 1A:
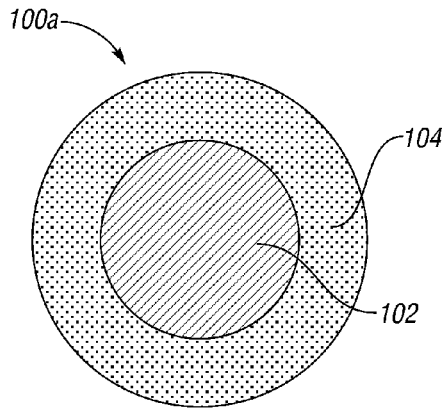
FIGS. 1A to 1F depict various forms of a hydrogen storage system according to one or more embodiments.

According to one aspect of the present invention, a hydrogen storage system is provided. In one embodiment, and as depicted in FIG. 1A, a cross-sectional view of a hydrogen storage system generally shown at 100a includes a volume of hydrogen sorbent material 102 and a volume of crystalline metal hydride material 104 adjacent the volume of hydrogen sorbent material 102. In a variation detailed herein as FIG. 1C, a hydrogen storage system generally shown at 100c includes a volume of amorphous metal hydride material 106 forming an outer shell enclosing at least a portion of the volume 102.

In certain instances, the volume of hydrogen sorbent material 102 includes activated carbons, graphene structured BN, metal organic frameworks (MOFs), zeolites, aerogels, or combinations thereof. In other certain instances, the volume of crystalline metal hydride material 104 includes AB type alloys, $AB_2$ type alloys, BCC type alloys, $AB_5$ type alloys, $A_2B$ type alloys, or combinations thereof. In yet certain other instances, the volume of amorphous metal hydride material 106 includes Zr—Ni alloys, Fe—Ti alloys, Ti—Ni alloys, V—Cr—Mn—Mo alloys, Pd—Si alloys, or combinations thereof.

Without wanting to be limited to any particular theory, it is believed that hydrogen atoms dissociated from molecular hydrogen on or within the volume of crystalline metal hydride material 104 or the volume of amorphous metal hydride material 106 can readily move from the volume 104 or 106 into the volume 102 where unoccupied hydrogen storage sites are readily available. This dissociation and storage process is synergized by the nature of the metal hydride material in the volume 104 or 106 being capable of functioning as an atomic hydrogen reservoir, wherein hydrogen dissociation can take place in situ.

Figure 1B:
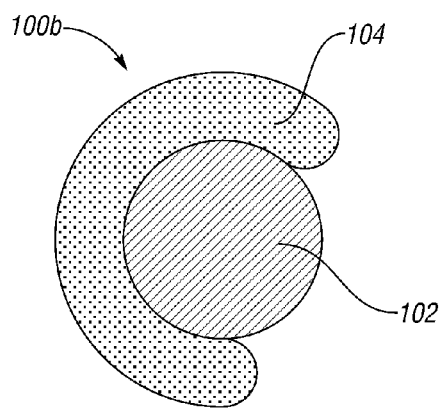

In one or more embodiments, the term "crystalline metal hydride material" may refer to a metal hydride wherein atoms in the crystal lattice are regularly arranged in three dimensions, both rotationally and translationally. The crystalline structure may be obtained through high energy ball milling, rapid quenching, and/or laser processing. A non-limiting crystalline structure of the crystalline metal hydride material may be shown in FIG. 3A1. As depicted in FIG. 3A2, on a non-limiting P-C-T curve of the crystalline metal hydride material, there exists a clear plateau area during which hydrogen absorption continues while the pressure remains substantially unchanged. Without wanting to be limited to any particular theory, it is believed that hydrogen atoms are being received in the energy-favorable interstitial sites of the crystalline hydride material during the pressure plateau period. In certain instances, the crystalline metal hydride material may have a hydrogen absorption capacity of increasing from 0.3 to 1.2 and particularly 0.4 to 0.6 hydrogen-to-metal atomic ratio with a corresponding pressure increase of less than 0.2 Atm at 40 degrees Celsius.

In one or more embodiments, the term "amorphous metal hydride material" may refer to a metal hydride wherein atoms in the crystal lattice are not regularly arranged in all three dimensions, either rotationally or translationally. A non-limiting amorphous structure of the amorphous metal hydride material may be shown in FIG. 3B1. When present, atomic arrangement comes with broken structure, varies with location, and is in short-range order. As depicted in FIG. 3B2, on a non-limiting P-C-T curve of the amorphous metal hydride material, there does not exist a clear plateau area unlike the case for crystalline metal hydride material. In certain instances, the amorphous metal hydride material may have a hydrogen absorption capacity of increasing from 0.4 to 0.6 hydrogen-to-metal atomic ratio with a corresponding pressure increase of greater than 1.0 Atm at 40 degrees Celsius.

Figure 1C:
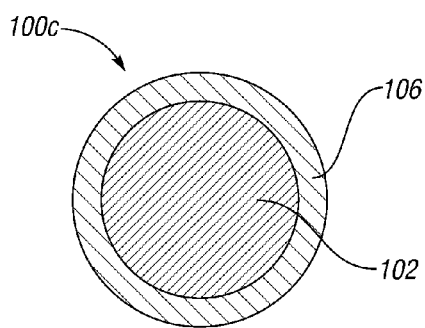
Figure 1D:
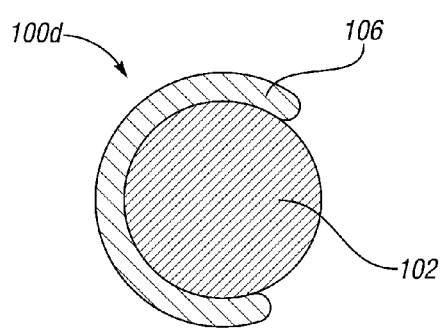
Figure 2:
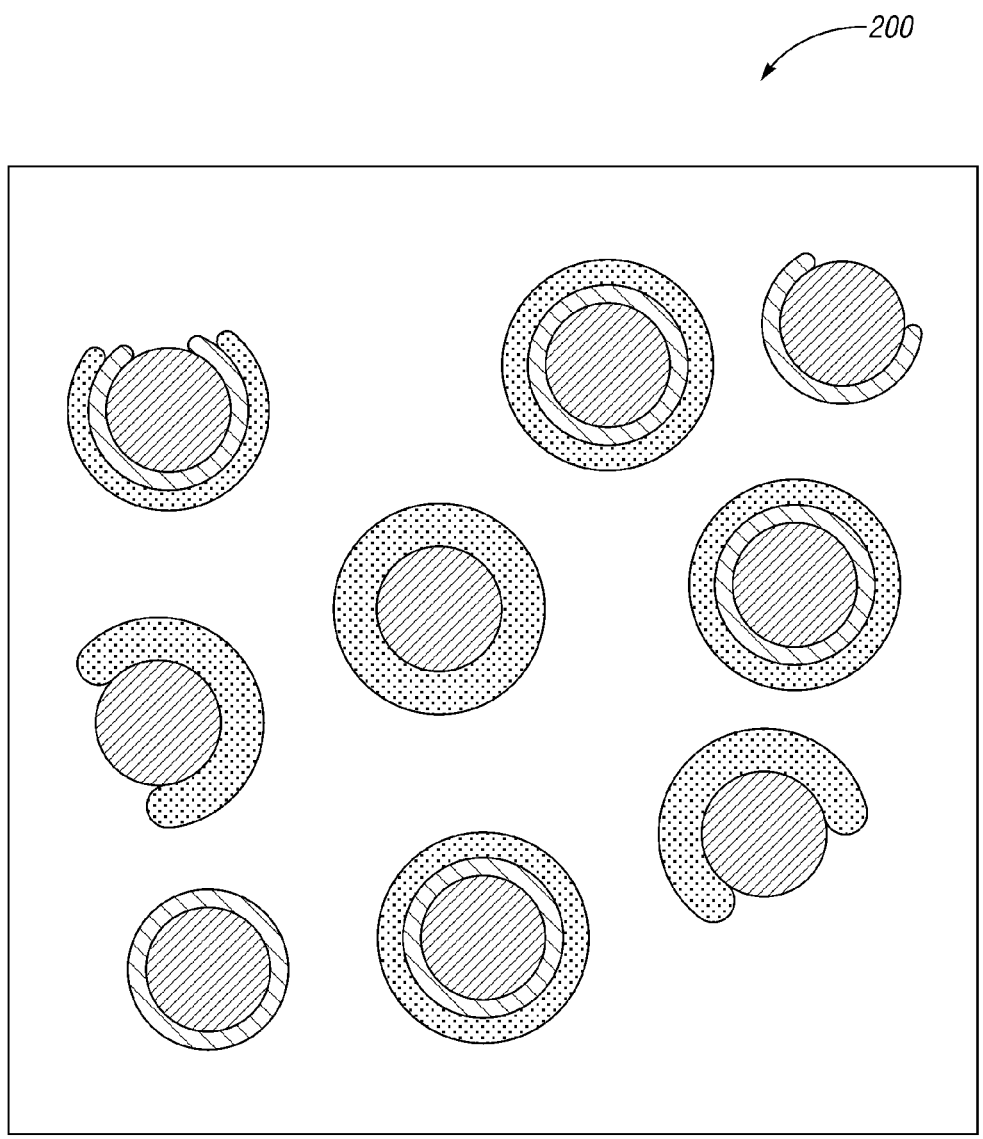
FIG. 2 depicts another form of a hydrogen storage system according to one or more embodiments.

Although being depicted in FIGS. 1A and 1C as enclosing the volume of sorbent hydrogen material 102, the volume of crystalline metal hydride material 104 or the volume of amorphous metal hydride material 106 does not necessarily have to fully enclose the volume of sorbent hydrogen material 102. In suitable variations, and as depicted in FIGS. 1B and 1D, the volume of crystalline metal hydride material 104 and the volume of amorphous metal hydride material 106 may each independently be positioned next to, and in certain instances may be contacting, a portion of the volume of hydrogen sorbent material 102, to form hydrogen storage systems 100b and 100d depicted in FIGS. 1B and 1D, respectively. The portion may be 10 to 30 percent, 30 to 50 percent, 50 to 70 percent, 70 to 90 percent, or 90 to 99 percent.

Figure 1E:
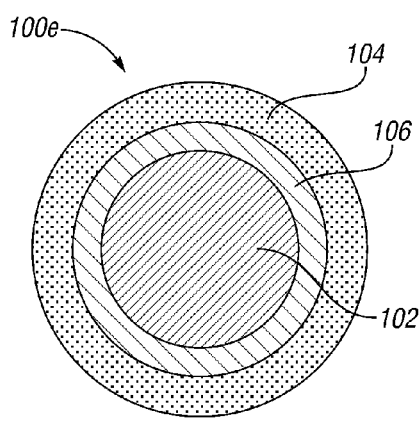

In yet another embodiment, and as depicted in FIG. 1E, a hydrogen storage system generally shown at 100e is configured to include three components, namely, the volume of hydrogen sorbent material 102 as the core, the volume of crystalline metal hydride material 104 as the shell enclosing at least a portion of the core of volume 102, and an intermediate layer of amorphous metal hydride material 106 with at least a portion thereof being positioned between the volumes 102, 104. As with the hydrogen storage material 100b of FIG. 1B or the hydrogen storage material 100d of FIG. 1D, the volume of amorphous metal hydride material 106 of FIG. 1E does not necessarily have to fully enclose the volume 102, nor does it have to be fully enclosed by the volume 104.

Without wanting to be limited to any particular theory, it is believed that the crystalline metal hydride material 104 has energy-favorable interstitial sites for temporarily storing the hydrogen atoms dissociated locally or in situ; the temporarily stored hydrogen atoms can be quickly received by the amorphous metal hydride material 106, which provides a hydrogen transport passage for passing the hydrogen atoms to the available storage sites in the hydrogen sorbent material 102. As a result, the crystalline metal hydride material 104, the amorphous metal hydride material 106, and the hydrogen sorbent material 102, together synergistically form a system for storing hydrogen.

Figure 1F:
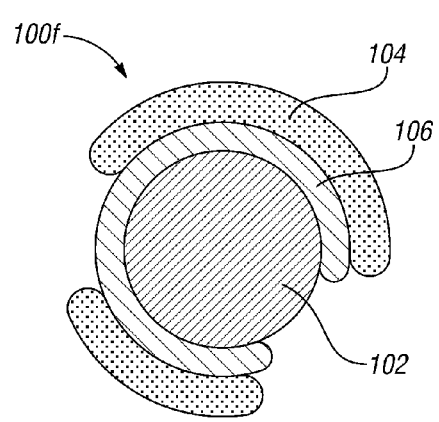

Although being depicted in FIG. 1E as enclosing the volume of sorbent hydrogen material 102 and/or the volume of amorphous metal hydride material 106, the volume of crystalline metal hydride material 104 does not necessarily have to fully enclose the volume 102, or the volume 106. In suitable variations, and as depicted in FIG. 1F, the crystalline metal hydride material 104 may be positioned next to, and in certain instances may be contacting, a portion of the volume of amorphous metal hydride material 106. The volume of amorphous metal hydride material 106 may be positioned next to, and in certain instances may be contacting, a portion of the volume of hydrogen sorbent material 102. Each of the portions may independently be 10 to 30 percent, 30 to 50 percent, 50 to 70 percent, 70 to 90 percent, or 90 to 99 percent.

Without wanting to be limited to any particular theory, it is believed that the intermediate volume of amorphous metal hydride material 106 provides an energy preferred atomic hydrogen transportation path between site of hydrogen dissociation in and around the volume 104 and site of atomic hydrogen storage in and around the volume 102, by lowering kinetic barrier for atomic hydrogen transport. It is further believed that the intermediate volume of amorphous metal hydride material 106 may reduce recombination of hydrogen atoms during their transport and/or adsorption into the volume of hydrogen sorbent material 102, particularly under unexpected or unnecessary temperature and pressure perturbation.

Although depicted in FIGS. 1A to 1F as one bulk structure, the hydrogen storage systems 100a to 100f may be varied as one generally shown at 200 in FIG. 2 to include a plurality of sub-systems 210. The sub-systems 210 may each be configured as 100a of FIG. 1A, 100b of FIG. 1B, 100c of FIG. 1C, 100d of FIG. 1D, 100e of FIG. 1E and/or 100f of FIG. 1F. Without wanting to be limited to any particular theory, it is believed that the hydrogen storage system 200 may offer greater flexibility in designing a collective surface area suitable for a particular hydrogen storage project.

The volume of crystalline metal hydride material 104 may include one or more metal hydrides selected from the group consisting of a) AB-type hydrides such as Fe—Ti hydride, b) $AB_2$-type hydrides such as Ti(Zr)—Mn—Cr hydride, c) BCC-type hydrides such as Ti—Cr—V hydride, d) $AB_5$-type hydrides such as $LaNi_5$ hydride, e) $A_2B$ type hydrides such as $Mg_2Cu$ and $Mg_2Ni$ hydrides, or f) any combinations thereof. Without wanting to be limited to any particular theory, it is believed that these metal hydride materials enable hydrogen to be packed even closer together than compressed or liquefied hydrogen. It is further believed that hydrogen in these materials is relatively loosely deposited in the void spaces within the metal hydride structure. Therefore, hydrogen as present in the metal hydride is not substantially chemically bonded to the metal hydride.

In one or more embodiments, the volume of hydrogen sorbent material 102 may include one or more porous lightweight materials with relatively high surface areas to which hydrogen can physically adsorb, for instance via physisorption mechanism. The amount of hydrogen adsorbed may be proportional to a sorbent's surface area. Non-limiting examples of the sorbents include carbon-based sorbents such as activated carbon, aerogels, and foam, and metal-based sorbents such as metal-organic frameworks (MOFs).

Non-limiting examples of the MOFs include: a catalytically-active MOF-5 having embedded metal, such as Ag@$[Zn_4O(BDC)_3]$, Pt@$[Zn_4O(BDC)_3]$, Cu@$[Zn_4O(BDC)_3]$, and Pd@$[Zn_4O(BDC)_3]$; an organically solvated MOF, such as $Ti(O^iPr)_4[Cd_3Cl_6(LI)_3.4DMF.6MeOH.3H_2O$, $Ti(O^iPr)_4[Cd_3(NO_3)_6(LI)_4.7MeOH.5H_2O$, $Ti(O^iPr)_4[Cd(LI)_2(H_2O)_2][ClO_4]_2.DMF.4MeOH.3H_2O$, $[Rh_2(M^{2+}TCPP)_2]$, where $M^{2+}$ may include Cu, Ni, or Pd, and $[Zn_2(BPDC)_2(L2)].10DMF.8H_2O$; an ionically or partially ionically solvated MOF, such as $[Ni(L\text{-}aspartate)bpy_{0.5}]HCl_{0.9}MeOH_{0.5}$, $[Cu(L\text{-}aspartate)bpy_{0.5}]HCl$, $[Cu(D\text{-}aspartate)bpy_{0.5}]HCl$, $[Cu(D\text{-}aspartate)bpy_{0.5}]HCl$, $Cr_3(F,OH)(en)_2O(BDC)_3$(ED-MIL-101), $[Zn_3O(L3\text{-}H)].(H_3O)_2(H_2O)_{12}$(D-POST-1), $[Sm(L4\text{-}H_2)(L4\text{-}H_3)(H_2O)_4].(H_2O)_x$, $[Cu(bpy)(H_2O)_2(BF_4)(bpy)]$, $[Zn_4O(BDC)_3]$(MOF-5) $[Ln(OH)H_2O)$(naphthalenedisulfonate)] where Ln includes a lanthanide metal such as Nd, Pr, or La; as well as $[In_4(OH)_6(BDC)_3]$, $[Cu_3(BTC)_2]$, $[Sc_2(BDC)_3]$, $[Sc_2(BDC)_{2.5}(OH)]$, $[Y_2(BDC)_3(H_2O)_2].H_2O$, $[La_2(BDC)_3(H_2O)_2].H_2O$, [Pd (2-pymo)$_2$].$H_2O$, $[Rh_2(H2TCPP)_2]BF_4$, $[Cu_2$(trans-1,4 cyclohexanedicarboxylate)$]H_2O$, [Cu (2-pymo)$_2$], $[Co(PhIM)_2]$, $[In_2(BDC)_3(bpy)_2]$, $[In_2(BDC)_2(OH)_2(phen)_2]$, $[In(BTC)(H_2O)(bpy)]$, $[In(BTC)(H_2O)(phen)]$, $[Sc_2(BDC)_{2.5}(OH)]$, $[Y_2(BDC)_3(H_2O)_2].H_2O$, $[La_2(BDC)_3(H_2O)_2]H_2O$, $[Cu_3(BTC)_2]$, $[Cd(4,4'\text{-}bpy)_2(H_2O)_2]$—$(NO_3)_2.(H_2O)_4$, $[Sm(L4\text{-}H_2)$ $(L4\text{-}H_3)(H_2O)_4].(H_2O)_x$, $Mn_3[(Mn_4Cl)(BTT)_8(MeOH)_{10}]_2$, $[Zn_4O(BDC)_3]$(MOF-5), Ti-(2,7-dihydroxynaphthalene)-MOF, [Pd(2-pymo)$_2$], $[Cu_3(BTC)_2]$, $[Rh_2(L5)]$, [Rh(BDC)], [Rh(fumarate)], $[Ru(1,4\text{-diisocyanobenzene})_2]Cl_2$, $[Ru_2(BDC)_2]$, $[Ru_2(BPDC)_2]$, $[Ru_2(BDC)_2(dabco)]$, $[Ru_2(BPDC)_2(dabco)]$, $[Rh_2(fumarate)_2]$, $[Rh_2(BDC)_2]$, $[Rh_2(H_2TCPP)_2]$, and [Pd (2-pymo)$_2$].

As mentioned herein elsewhere, and in one or more embodiments, the term "amorphous metal hydride material" refers to metallic glasses and/or glass metals including one or more types of metal alloys with atoms of significantly different sizes, low free volume and high viscosity in molten state. In certain instances, the volume of amorphous metal hydride 106 includes one or more amorphous M1-M2 alloys, where M1 is Ti, Zr, Pd, V, Mg, a rare earth metal, or combinations thereof, and where M2 is Cr, Mn, Fe, Co, Ni, Mo, Nb, Ta, W, Al, Si, B, or combinations thereof. The rare earth metals may include Sc, Y, La, Ce, Pr, Nd, Pm, Sm, Eu, Gd, Tb, Dy, Ho, Er, Tm, Yb and Lu. In certain particular instances, non-limiting examples of the amorphous metal hydride material include Zr—Ni alloys, Ti—Ni alloys, Ti—Fe alloys, V—Cr—Mn—Mo alloys, Pd—Si alloys, or combinations thereof.

A weight ratio between the weight in the volume of hydrogen sorbent material 102 and the weight in the volume of crystalline metal hydride material 104 can be of any suitable values. In certain instances, this weight ratio is 1:100 to 100:1, 1:50 to 50:1, 1:10 to 10:1, 1:8 to 8:1, 1:6 to 6:1, 1:4 to 4:1, or 1:2 to 2:1.

A weight ratio between the weight in the volume of hydrogen sorbent material 102 and the weight in the volume of amorphous metal hydride material 106 can be of any suitable values. In certain instances, this weight ratio is 1:100 to 100:1, 1:50 to 50:1, 1:10 to 10:1, 1:8 to 8:1, 1:6 to 6:1, 1:4 to 4:1, or 1:2 to 2:1.

According to another aspect of the present invention, a method is provided to store and release hydrogen. In one embodiment, the method includes introducing hydrogen into a hydrogen storage system 100a, 100b, 100c, 100d, 100e, 100f, 200 as described herein. In certain instances, the introducing step is carried out at a temperature of 100 Kelvin to 353 Kelvin. By this method, the hydrogen storage system 100a, 100b, 100c, 100d, 100e, 100f, 200 is configured to store hydrogen at a relatively less stringent temperature, for instance a non-cryogenic temperature that does not necessarily require a great amount of energy to form and/or to maintain, as compared to the conventional storage systems that uses cryogenic or para-cryogenic conditions wherein a temperature of more negative than 123 degrees Kelvin may be required. In certain instances, the temperature at which the hydrogen storage system 100a, 100b, 100c, 100d, 100e, 100f, 200 is to be maintained can be in a range of from 77 to 500 degrees Kelvin, or from 123 to 353 degrees Kelvin.

In another embodiment, the method further includes extracting hydrogen out from the charged hydrogen storage material. In certain instances, the extracting step is carried out at a temperature between 100 Kelvin and 353 Kelvin.

In one or more embodiments, the term "hydrogen desorption" or "hydrogen release" may refer to liberation of hydrogen from the hydrogen storage material 100a, 100b, 100c, 100d, 100e, 100f, 200. It is not intended to indicate that complete release has necessarily occurred, and contemplates both a complete release and a partial release resulting from liberation of at least part of the hydrogen content of the material.

In yet another embodiment, the core particles such as the volume 102 or the volume 102 plus the volume 106 may be mechanically processed into a pre-activated form prior to coating with the volume of 104. For some applications, the mechanical process serves simply to agitate or stir the hydrogen storage material. In one particular embodiment, the mechanical process reduces the size of the particles in the hydrogen storage materials.

The mechanical processing methods illustratively include mixing, grinding, milling, or combinations thereof. In certain situations, the following mechanical processes are used: manual mixing, mechanically assisted mixing, ball milling, manual grinding, sand milling, horizontal milling, vertical milling, jet milling, jaw crusher milling, hammer milling, and high pressure dispersion milling.

In yet another embodiment, the volume of amorphous metal hydride material 106 can be processed by using melt-spinning, mechanical alloying, and thereafter mechanically processed onto the surface of the sorbents. In yet another embodiment, the volume of amorphous metal hydride material 106 can be processed onto the surface of sorbent 102 by physical vapor deposition, chemical vapor deposition, chemical deposition, electrochemical deposition or a combination thereof.

The hydrogen storage system 100a, 100b, 100c, 100d, 100e, 100f, and subsystems 210 of system 200 can also be in any suitable physical form. For example, the hydrogen storage and desorption material can be in particulate form, e.g., powder, single crystalline, polycrystalline, nanocrystalline, microcrystalline, pelletized, granular, and so on.

The hydrogen storage system 100a, 100b, 100c, 100d, 100e, 100f, and subsystems 210 of system 200 can also have any of several morphologies, including approximately spherical, oblong, rectangular, square planar, trigonal bipyramidal, cylindrical, octahedral, cubooctahedral, icosahedral, rhombohedral, rod-shaped, cuboidal, pyramidal, amorphous; and can be in non-particulate form, e.g., in block form, in sheet form, as a coating, a film, an interconnected or interwoven network, or a combination thereof.

The size of the subsystems 210 of system 200 is not particularly critical to the operability of the present invention. For example, any one or more dimensions of the particles can be 1 centimeter or less, 50 millimeters or less, 40 millimeters or less, 30 millimeters or less, 20 millimeters or less, 10 millimeters or less, 1 millimeter or less, 500 micrometers or less, 250 micrometers or less, 100 micrometers or less, 50 micrometers or less, 20 micrometers or less, 10 micrometers or less, 1 micron or less, 500 nanometers or less, 250 nanometers or less, 100 nanometers or less, 50 nanometers or less, and so on.

While the best mode for carrying out the invention has been described in detail, those familiar with the art to which this invention relates will recognize various alternative designs and embodiments for practicing the invention as defined by the following claims.

What is claimed:

1. A hydrogen storage system comprising:
    a core of hydrogen sorbent material;
    a shell of crystalline metal hydride material at least partially enclosing the core of hydrogen sorbent material; and
    an intermediate layer of amorphous metal hydride material, at least a portion of which being positioned between the core of hydrogen sorbent material and the shell of crystalline metal hydride material.

2. The hydrogen storage system of claim 1 configured as a plurality core/shell particles.

3. The hydrogen storage system of claim 1, wherein the crystalline metal hydride material has a hydrogen absorption capacity of increasing from 0.3 to 1.2 hydrogen-to-metal atomic ratio with a corresponding pressure increase of less than 0.2 Atm at 40 degrees Celsius.

4. The hydrogen storage system of claim 1, wherein the amorphous metal hydride material has a hydrogen absorption capacity of increasing from 0.4 to 0.6 hydrogen-to-metal atomic ratio with a corresponding pressure increase of greater than 1.0 Atm at 40 degrees Celsius.

5. The hydrogen storage system of claim 1, wherein the core of hydrogen sorbent material includes activated carbons, graphene structured BN, metal organic frameworks (MOFs), zeolites, aerogels, or combinations thereof.

6. The hydrogen storage system of claim 1, wherein the shell of crystalline metal hydride material includes AB type alloys, $AB_2$ type alloys, BCC type alloys, $AB_5$ type alloys, $A_2B$ type alloys, or combinations thereof.

7. The hydrogen storage system of claim 1, wherein the intermediate layer of amorphous metal hydride material includes Zr—Ni alloys, Fe—Ti alloys, Ti—Ni alloys, V—Cr—Mn—Mo alloys, Pd—Si alloys, or combinations thereof.

8. A method of making a hydrogen storage system, comprising:
    forming a plurality of hydrogen storage units each including a core of hydrogen sorbent material and a shell of metal hydride material at least partially enclosing the core of hydrogen sorbent material.

9. The method of claim 8, wherein at least a portion of the plurality of hydrogen storage units are formed to have an intermediate layer of amorphous metal hydride material disposed between the core of hydrogen sorbent material and the shell of metal hydride material.

10. The method of claim 8, further comprising introducing hydrogen into the plurality of hydrogen storage units to form a hydrogen storage system.

11. The method of claim 10, wherein the introducing step is carried out at a temperature of 100 Kelvin to 350 Kelvin.

* * * * *